April 24, 1928.

R. E. POWELL

CONNECTER

Original Filed April 23, 1926

1,667,702

Ralph E. Powell
INVENTOR
BY Victor J. Evans
ATTORNEY

R. E. Wise
WITNESS:

Patented Apr. 24, 1928.

1,667,702

UNITED STATES PATENT OFFICE.

RALPH E. POWELL, OF TOLEDO, OHIO.

CONNECTER.

Application filed April 23, 1926, Serial No. 104,178. Renewed February 4, 1928.

The object of this invention is to provide a device especially adapted for use as a battery connecter, the principle being adapted for application under other conditions, where an element constituting in a sense a hub portion is to be secured to a cylindrical or slightly tapered element, or to a member angular in cross section.

A further object is to provide a connecter in which the main portion may be provided with a socket for receiving the end of a cable, and provided with a socket of larger diameter extending perpendicularly with reference to the socket first named, the second socket having a wall producing a flare in one direction,—a tapered member constituting a form of wedge being adapted for cooperation with the flared wall, and means being provided for securing the wedge in clamping position.

A further object is to provide a wedge, for the purpose indicated, which shall have an outer convex surface and an inner concave surface, the latter being adapted for cooperation with the curved surface of a battery terminal, or with any curved surface with which the main element of the clamp is to be connected.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1:
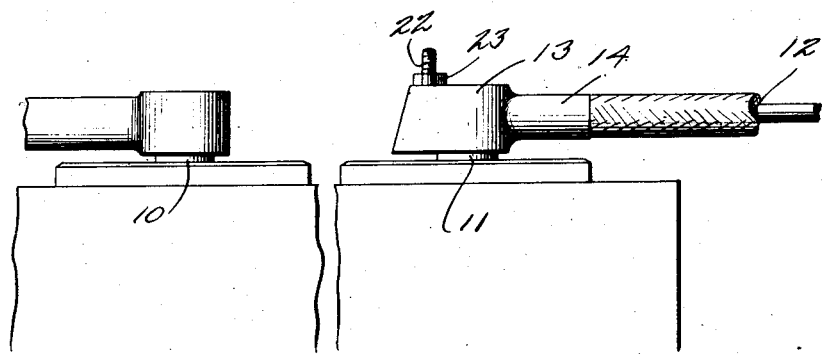
Figure 1 shows a plurality of connecters in elevation, a portion of a battery being shown diagrammatically.

The terminals of a battery are illustrated in Figure 1, being there designated 10 and 11, and a portion of a cable for connection with one of the devices forming the subject matter of this case, is illustrated 12, the shank portion of the oppositely located connecter being broken away.

The heavy portion of one of the connecters is designated 13, and the shank portion formed therewith is shown at 14, this shank portion constituting a socket member having a bore 15 therein.

A larger bore 16 extends perpendicularly with reference to the bore 15, and is adapted to fit over one of the terminals, or posts, such as post 11.

Figure 2:
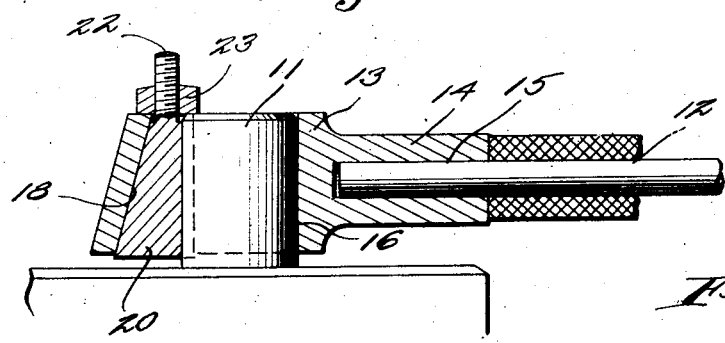
Figure 2 shows one of the connecters in vertical longitudinal section.
Figure 4:
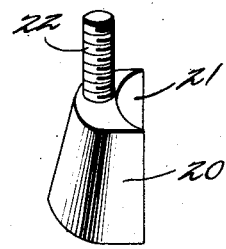
Figure 4 is a perspective view of the wedge element.
Figure 3:
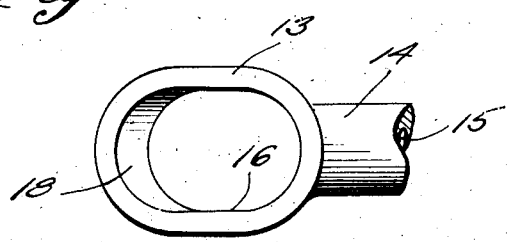
Figure 3 is a bottom plan view, with the shank portion broken away.

The upper portion of bore 16, or socket 16, is approximately circular, but the lower portion is elliptical, as shown in Figure 3, providing a flared or inclined wall 18 adapted for cooperation with the clamping member illustrated especially in Figures 2 and 4.

For convenience, the element 20 may be termed a wedge, being of greater cross section at the lower portion than at the upper portion, and providing a surface tapering uniformly, on the outer side. This surface is curved in conformity with the curvature of the wall 18, providing a convex portion. The inner portion or side of the wedge, designated 21, is concave, and the curvature conforms to the curvature of the element 11. In Figure 2, the shank 22 is shown as formed with the main portion of the wedge, and a nut is threaded onto the shank, and engages the upper edge portion or surface of the connecter and of element 11. The shank 22 may however, be threaded into the body of the wedge, and the latter may be of any suitable cross section, that shown herein being by way of example.

It is obvious that a device similarly formed may be employed for mounting a wheel on a shaft, where rigid connection is to be provided.

Having thus described the invention, what I claim is:

A connecter of the class described, comprising an element including a shank portion and having a socket extending perpendicularly of the main axis of the shank portion, the socket having elliptical edge portions of different area with an intervening flared wall, a tapered element adapted to engage the flared wall and to engage an element received within the socket, said tapered element having an outer convex surface and an outer concave surface and including a threaded extension, and threaded means engaging the extension and the adjacent edge portion of the socket.

In testimony whereof I affix my signature.

RALPH E. POWELL.